(12) United States Patent
Richley et al.

(10) Patent No.: US 7,412,007 B1
(45) Date of Patent: Aug. 12, 2008

(54) HIGH EFFICIENCY ULTRA WIDEBAND GENERATOR

(75) Inventors: Edward A. Richley, Gaithersburg, MD (US); Robert J. Fontana, Potomac, MD (US)

(73) Assignee: Multispectral Solutions, Inc., Germantown, MD (US)

( * ) Notice: Subject to any disclaimer, the term of this patent is extended or adjusted under 35 U.S.C. 154(b) by 822 days.

(21) Appl. No.: 10/644,093

(22) Filed: Aug. 20, 2003

(51) Int. Cl.
*H04L 25/03* (2006.01)

(52) U.S. Cl. ....................................... 375/296

(58) Field of Classification Search ......... 375/295–297; 330/162, 202; 333/167, 202; 370/310, 328, 370/329, 335, 342; 326/21, 22, 23, 24; 455/91, 455/120, 124, 129; 324/600, 649, 654, 655
See application file for complete search history.

(56) References Cited

U.S. PATENT DOCUMENTS

| | | | | |
|---|---|---|---|---|
| 3,584,289 A * | 6/1971 | Bishop et al. | ................. | 363/97 |
| 3,858,126 A * | 12/1974 | Kameya | ..................... | 333/138 |
| 3,886,316 A * | 5/1975 | Getgen | ....................... | 370/308 |
| 3,967,173 A * | 6/1976 | Stich | .......................... | 318/811 |
| 3,973,204 A * | 8/1976 | Keiter | ..................... | 455/197.1 |
| 5,325,000 A * | 6/1994 | Birkeland et al. | .......... | 455/313 |
| 5,465,420 A * | 11/1995 | Dougherty et al. | ......... | 455/333 |
| 6,288,613 B1 * | 9/2001 | Bennett | ..................... | 330/296 |
| 7,006,553 B1 * | 2/2006 | McCorkle | ................... | 375/130 |

\* cited by examiner

*Primary Examiner*—Mohammad H. Ghayour
*Assistant Examiner*—Vineeta S Panwalkar
(74) *Attorney, Agent, or Firm*—Harbin Klima Law Group PLLC

(57) ABSTRACT

A method and system to produce a spectrally filtered ultra wideband (UWB) signal preferably utilizing a singly terminated filter having an input section and a current switching device directly coupled to the input section. The switching device is operated in a highly nonlinear manner such that an impulse of energy excites the filter in such a way that a vast majority of impulse energy is transmitted to an antenna after spectral filtering thereby yielding a highly efficient, broadband (e.g., ultra wideband) transmission. A substantial fraction of the current switched into the filter passes directly to the antenna. Optionally, the input section of the filter possesses a secondary resonance and the current switching device has a conduction time chosen to be compatible with the secondary resonance.

17 Claims, 6 Drawing Sheets

HIGH EFFICIENCY ULTRA WIDEBAND GENERATOR

BACKGROUND

The present invention relates to wideband transmitters, but more specifically, to a method and an apparatus to produce spectrally-controlled wideband pulses with high DC-to-RF power efficiency that may be used in communications, radar or geopositioning systems.

The need to spectrally control emissions of a UWB signal at high DC-to-RF power efficiency is important for both regulatory and practical reasons. From a regulatory perspective, the ability to generate ultra wideband, or short pulse, waveforms that avoid operation in select bands is often necessary to prevent interference with existing radio-frequency (RF) services. Furthermore, in many cases, a flat power spectral density of a wideband emission in which each unit Hertz of bandwidth contains essentially the same amount of energy, is desirable to minimize interference to narrowband receivers operating over the same band. Thus, spectral shaping, filtering, or band-limiting—for both frequency translation and spectral whitening—is usually desirable in UWB transmitter designs. From a practical perspective, a high DC-to-RF efficient pulse transmission also permits extended operational life of the equipment in battery-operated designs.

Larrick et al. (commonly-owned U.S. Pat. No. 6,026,125) discuss methods for generating spectrally controllable UWB transmissions. There, a low level impulse excitation is spectrally shaped or filtered, and subsequently heterodyned (if necessary) to reach a desired operational center frequency. Subsequent time-gated linear amplification is then used to achieve the desired peak power output. In Larrick et al., the impulse generator is physically distinct from the filter which, in turn, is physically distinct from the gated output amplifier. As Larrick et al. point out, impulse excitation is typically generated at a low RF level to enable faster switching (e.g., higher data rates of operation) and to prevent overload of any subsequent amplifier stages that are operated either in their linear mode or near output saturation levels. To reach a desired peak power output, subsequent gated power amplifier stages may be added. This, however, adds further cost and complexity to the system.

More rigorously, the impulse generator of Larrick et al. can be treated as a Thevenin source consisting of an equivalent "ideal" impulse generator and an output impedance that is typically impedance-matched with following filter circuitry. In conventional designs, such impedance-matching was achieved (particularly because of the wide range of frequencies over which the match must be realized) through the use of passive, lossy elements such as resistive pads or attenuators.

The subsequent shaping or bandpass filter network connected to the low level impulse source was thus doubly terminated; having its input terminated by the equivalent Thevenin impedance of the impulse generator and having its output terminated by the input impedance of the subsequent power amplifier stages. Energy efficiency was obtained by time-gating the power amplifier so that it was active only for a time period roughly equivalent to the time of occurrence and duration of the filtered UWB pulse.

However, additional time had to be allowed for inevitable transient effects associated with gated switching of the power amplifier so that, in practice, the power amplifier was active for a substantially longer time than the duration of the filtered UWB pulse. Furthermore, such power amplifier devices were typically operated in their linear mode during pulse production; and, hence, were ultimately limited in their DC-to-RF conversion efficiency, even in the gated regime.

SUMMARY OF THE INVENTION

According to the present invention, a wideband power transmitter having high efficiency, i.e., greater than 50% power conversion, is achieved through the use of a combination of nonlinear switching and, preferably, a singly terminated filter network that effectively provides pulse amplification. By properly controlling pulse timing and resonance effects of the filter input, and by integrating parasitic reactances of the switching device into the resultant filter design, wideband pulses having peak power levels from microwatts to several hundred watts can be produced at high DC-to-RF conversion efficiencies. Thus, a subsequent power amplifier stage may, if desired, be completely eliminated. This simplifies the wideband transmitter and improves reliability.

According to an aspect of the invention, there is provided a system for generating band-limited ultra wideband signals comprising a singly terminated filter having an input section and a current switching device directly coupled to the input section and operated in a highly nonlinear manner such that a substantial fraction of the current switched into the filter passes directly through the filter. Optionally, the input section possesses a secondary resonance and the current switching device may have a conduction time chosen to be compatible with the secondary resonance.

According to yet another aspect of the invention, there is provided a method of deriving circuit parameters of a desired filter network for a UWB pulse transmitter comprising the steps of providing a design of a normalized UWB filter network based on a given load impedance to yield a predetermined response for a UWB input pulse where the normalized UWB filter network comprises at least one shunt capacitor having a capacitance and at least one series inductor having an inductance, scaling values of the capacitance and inductance to attain a desired response (e.g., center-frequency, bandwidth, etc.) for a desired impedance load, and providing a filter network having the scaled values, whereby to derive said desired filter network. Preferably, the filter network is based on a singly terminated three-pole Chebyshev filter network. In addition, a timing circuit may turn off said transistor when current at the drain terminal approaches or nears zero. Also, the capacitance may be reduced in said scaling step by an amount equal to or approximating the parasitic capacitance of said switching device.

In yet another aspect of the invention, a method of supplying a spectrally filtered UWB signal to a load device comprises gating a switching device to produce a pulse, releasing the pulse into an inductor of a resonant circuit by switching off a conduction path of the switching device after issuing the UWB pulse where the resonant circuit provides a desired spectral response for said UWB pulse, and dissipating energy of the resonant circuit directly into the load device to produce the spectrally filtered UWB signal across said load device.

In yet a further aspect of the invention, the method comprises providing a pulse conditioning circuit having a predetermined spectral response, applying a bias voltage across an inductor of said pulse conditioning circuit, and releasing a pulse into the pulse conditioning circuit in a way to dissipate a majority of the pulse energy into a load device. Preferably, the releasing step comprises gating a conduction path of a field effect transistor to produce the pulse and operating the transistor in a non-linear mode to pinch-off the conduction path after release of said pulse. In addition, the method may provide a resonant circuit and timing release of the pulse in accordance with a resonant cycle of said resonant circuit. In addition, the method may include pinching-off the conduction path when drain current of the transistor reaches or is near zero. Further, the conduction path may be pinched-off to a fully non-conducting state.

In yet another aspect of the invention, there is provided an ultra wideband transmitter to transmit an ultra wideband signal comprising a switching device that produces a pulse in response to current flow through a conduction path thereof, a timing circuit to gate the switching device, a filter network including at least one shunt capacitor having a capacitance and at least one series inductor having an inductance where the filter network has an input coupled to the conduction path of the switching device and an output coupled to a load device, and a timing circuit to gate the switching device to release a pulse directly into the filter network and to pinch-off the conduction path after release of said ultra wideband pulse. In addition, the filter network may include a series inductor sectioned into two sections, and the switching device may include a drain terminal coupled to said filter network between the sectioned inductors whereby to produce opposing potentials at the drain terminal after issuing said ultra wideband pulse.

In yet a further aspect of the invention, there is provided an ultra wideband transmitter to supply a spectrally filtered UWB signal to a load device comprising a switching device having a gate to produce a pulse, a singly-terminated resonant circuit that provides a desired spectral response for the UWB pulse, the resonant circuit including a series inductor and a shunt capacitor, a timing circuit to drive the gate of the switching device to effect release of the UWB pulse into the inductor of the resonant circuit by immediately switching off a conduction path of the switching device after issuing the pulse, and a load device coupled to an output of the resonant circuit to dissipate energy directly into the load device, whereby to produce a spectrally filtered UWB signal across the load device.

In yet a further aspect of the invention, there is provided a highly-efficient ultra wideband transmitter having a power conversion ratio greater than 50% comprising an antenna, a resonant circuit having a singly terminated inductor-capacitor network coupled directly to the antenna, a switching device that applies a voltage potential across an inductor of the inductor-capacitor network of the resonant circuit, and a timing circuit to gate the switching device to open a conduction path thereof to supply a pulse directly to the resonant circuit, and to immediately pinch-off the conduction path of the switching device after release of the pulse to the resonant circuit, whereby to dissipate greater than 50% of pulse energy of the resonant circuit into the antenna.

Other aspects and features of the invention will become apparent upon review of the following description taken in connection with the accompanying drawings. The invention, though, is pointed out with particularity by the appended claims.

DESCRIPTION OF ILLUSTRATIVE EMBODIMENTS

Figure 1:
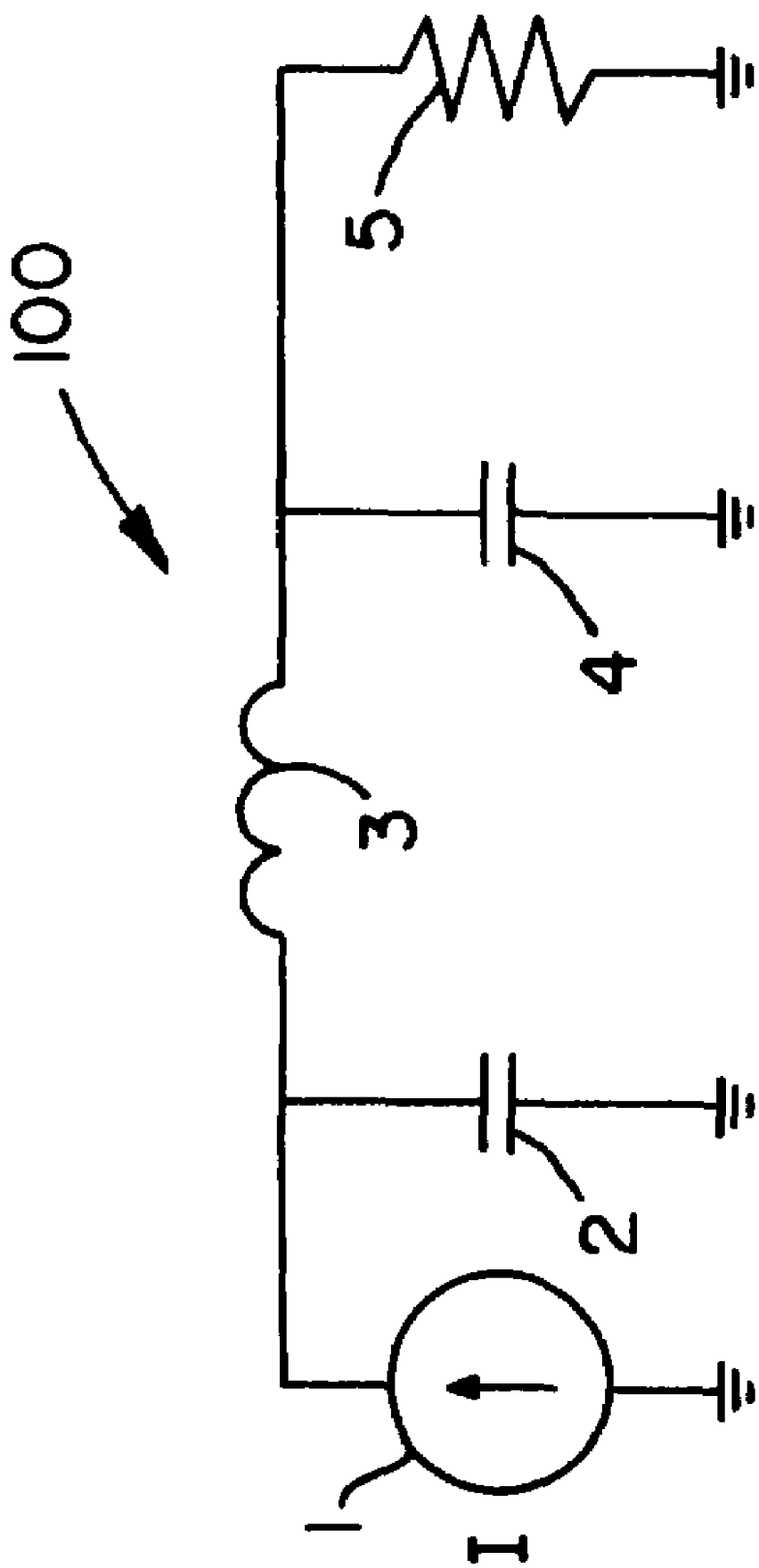
FIG. 1 shows a normalized model of an exemplary filter-amplifier circuit, e.g., a three-pole singly ended lowpass filter useful for deriving any desired three-pole bandpass filter meeting a desired performance.

Herein described is a method and an apparatus to generate spectrally controlled or filtered, UWB pulses at arbitrarily high power levels and with DC-to-RF conversion efficiencies that greatly exceed those achievable with conventional circuits and/or gated UWB amplifiers.

The preferred embodiment of the invention makes use of a unique application of singly terminated filter networks, which are filters that have resistive loading only at one end (e.g., from the input impedance of a following stage, the real part of the impedance of an antenna, or an intentional installed resistive load).

Singly terminated filters are described in detail, for example, in Zverev's *Handbook of Filter Synthesis*, John Wiley and Sons, NY, 1967. Such filters are generally designed to be driven with either a very high, or a very low, driving impedance and in such a manner that the source is not loaded to near its point of maximum power transfer (i.e., the source typically is not impedance matched with the load). As a result, the only resistive loss for the filter occurs at the load; or, alternatively, any energy introduced into the filter can only be dissipated at the load.

Now, by operating a current switching device (e.g., RF or microwave power transistor) in a highly nonlinear mode, the functions of an impulse generator, filter, and/or power amplifier can be combined into a single network or network stage which, for the sake of convenience, we herein refer to as a filter or filter network. During a short conduction cycle, substantially all of the current passing through the switching device is delivered to an input inductor of a singly terminated bandpass filter network. After the short conduction cycle, the switching device is turned off, and thereafter presents a predominantly reactive impedance to the filter. As a result, the contribution of the switching device to energy losses in the circuit is substantially eliminated. Furthermore, the reactive component of the switching device, which is typically capacitive, may be taken into account in the design of the preferred singly terminated filter to improve its performance.

Energy stored in the input inductor passes through the filter in a resonant fashion, and finds its way to the output load. Due to the single termination and reactive (non-dissipative) input, the energy released by the switching device is nearly completely delivered to the load. The transfer function of the filter (taking into account the reactive component of the switching device in its "off" mode) is designed to achieve the desired pulse shaping or spectral filtering (e.g., uniform spectral density over a particular band of operation).

In this manner, a very large fraction of the power delivered from the power supply to the circuit results in useable UWB RF energy at the output. Peak power output is only limited by the available current and voltage handling capacity of the switching device, which is typically tens of or even hundreds of watts.

A further refinement can increase the power conversion efficiency even further. This is accomplished by modifying the input section of the filter to create a resonant condition, and controlling the timing of the conduction cycle of the switching device such that transitions to its nonconducting mode occur at the precise instant that the current is passing through zero, e.g., turning off the transistor at a zero-crossing of a current swing. Advantageously, additional energy stored in the capacitors of the filter network is recovered and not wasted as a switching loss.

By way of the following illustrations, there is described a method of deriving a filter network having desired spectral shaping or filtering functions for a UWB pulse, as well as examples of actual circuits that carry out such functions.

FIG. 1 shows a normalized model of a singly terminated filter network 100 comprising a three-pole Chebyshev low-pass filter having a passband ripple of one decibel (1 dB). Network 100 includes a current source 1, a 1.509 Farad shunt capacitor 2, a 1.33 Henry series inductor 3, a 1.012 Farad shunt capacitor 4, and a unitary impedance, e.g., a one-ohm output impedance 5. As developed in the following description, a filter network having a desired function is derived by scaling circuit components of model filter 100.

In the network 100, values of the inductive and capacitive components have been normalized such that the 1 db ripple point occurs at a unitary measure of frequency, e.g., $1/(2\pi)$ Hertz. As driven by current source 1, the source termination impedance is infinite. However, the transfer function, defined herein as the ratio of the output voltage V across impedance 5 to the input current I of current source 1, has the desired Chebyshev response. Derivation of such a normalized model filter is covered in many texts, including the Zverev reference mentioned herein. The impulse response of model filter 100 is band-limited to produce a UWB signal when current source 1 comprises an impulse source.

Figure 2:
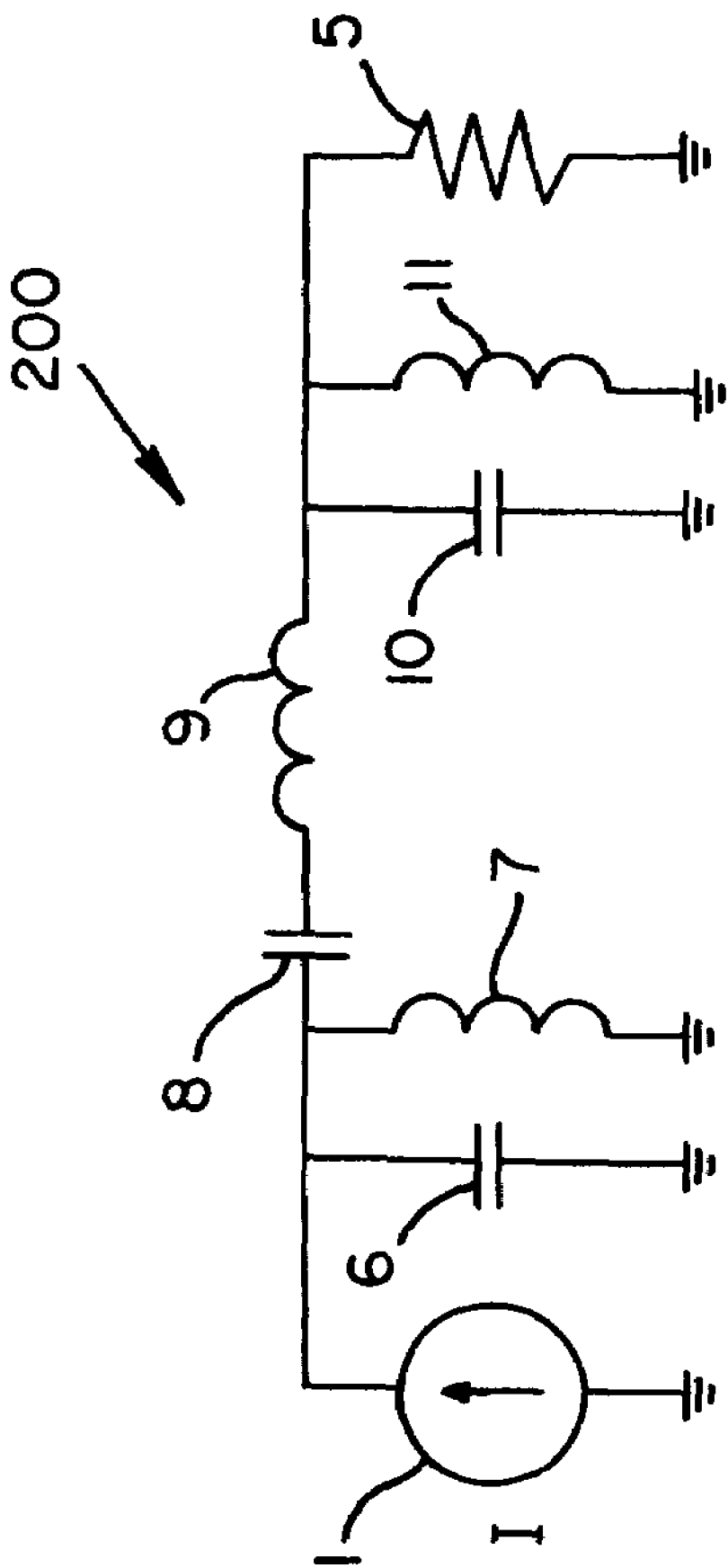
FIG. 2 shows a de-normalized bandpass filter network that accommodates a one-ohm load in the 30-50 MHz band.

In order to produce a band-limited UWB pulse having a particular power, spectral shaping, bandwidth and/or center-frequency, component values of model filter network 100 must be de-normalized. As an example, to produce a band-limited UWB system having 30-50 MHz response, component values of the normalized filter network 100 are first scaled to provide a 20 MHz bandwidth (using, for example, a 50% fractional bandwidth to define limits of the frequency band). This involves dividing all inductances and capacitances of the normalized filter network 100 by $2\pi \times (20 \times 10^6)$. Thus, the scaled values of capacitors 2 and 4 become 12.0 and 8.05 nanofarads (nF), and the value of inductor 3 becomes 10.6 nanohenrys (nH). FIG. 2 depicts corresponding circuit elements (i.e., capacitors 6 and 10, as well as inductor 9) having such scaled values.

To obtain the desired 20-MHz band-limiting response, as shown in FIG. 2, capacitors 6 and 10 (which correspond to capacitors 2 and 4 of normalized filter 100 of FIG. 1) are resonated in parallel with respective 5.28 nH and 7.87 nH inductors 7 and 11. Inductive component 9 (which corresponds to the inductor 3 of the normalized filter of FIG. 1) is resonated in series with a 5.97 nF capacitor 8. As apparent, the network may be scaled to accommodate a variety of desired bandwidths, frequency bands, or output impedance loads.

Figure 3:
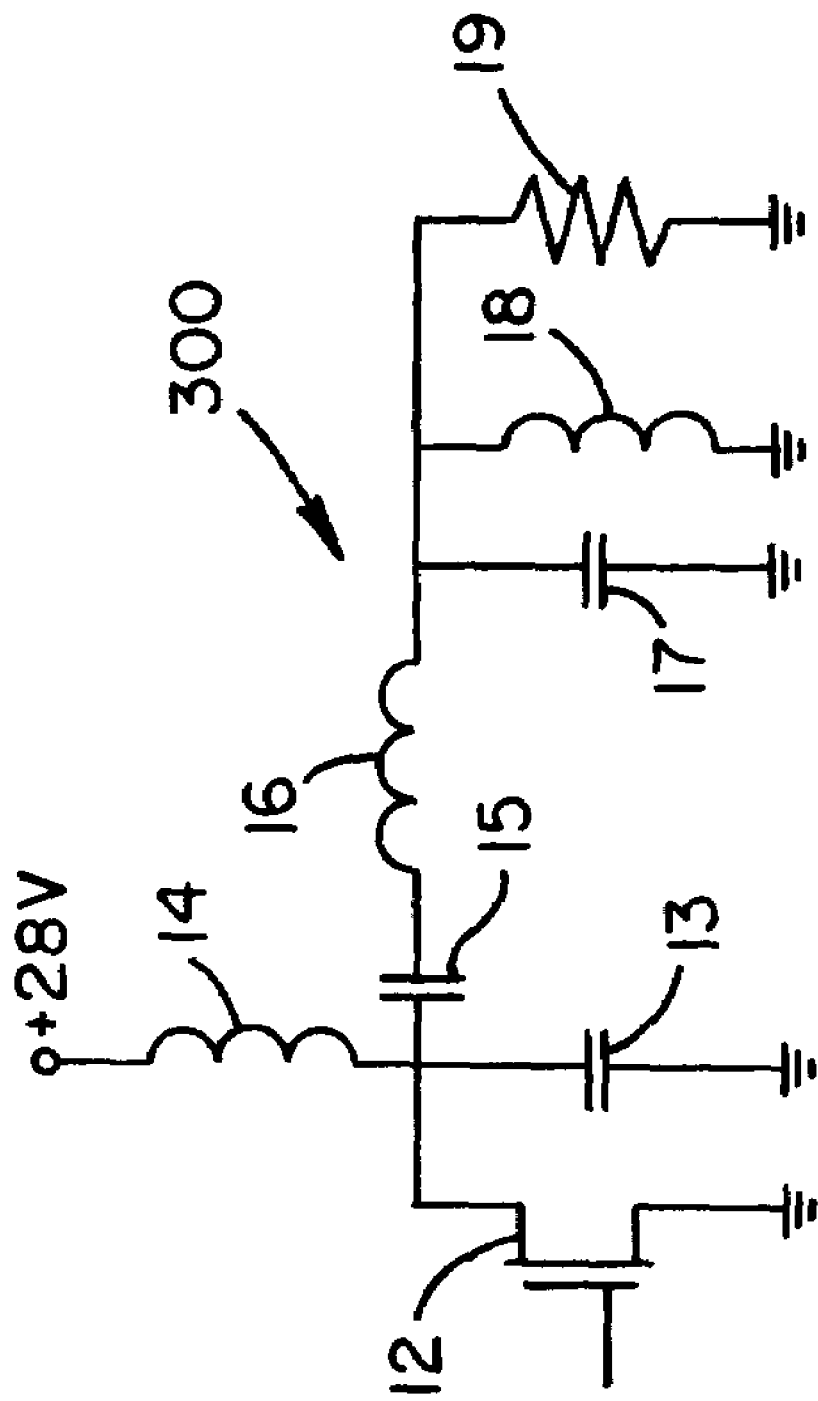
FIG. 3 shows a de-normalized bandpass filter network for a 50-ohm load in the 30-50 MHz band.

To derive a filter network 300 of FIG. 3 that accommodates a 50-ohm output impedance instead of the normalized value of 1Ω, e.g., an impedance ratio of 50, component values of network 200 of FIG. 2 were further scaled. As an initial estimate, inductor values are multiplied by the impedance ratio (50 in this case) and capacitor values are divided by the same impedance ratio. The current source has been replaced by transistor 12, which, in the illustrated embodiment, comprises an MRF166C field effect transistor. Since the output capacitance of a typical MRF166C transistor is approximately 30 pF, this amount was subtracted from the estimated 240 picofarad scaled value of capacitor 13, i.e., 12 nF value of capacitor 6 (FIG. 2) divided by 50 equals 240 picofarads, less 30 picofarad parasitic capacitance of transistor 12, yields a value of 210 picofarads for capacitor 12 in the scaled circuit 300. As such, the parasitic capacitance of the current source becomes integrated with the filter network to attain a desired resonance in accordance with an aspect of the present invention.

After scaling and adjusting component values of filter network 200 to match the desired 50-ohm output impedance with the desired response (e.g., bandwidth and/or center frequency for the impulse response), the resulting filter network 300 has a 66 nH inductor 14, a 30 pF capacitor 15, a 530 nH inductor 16, a 161 pF capacitor 17, and a 105 nH inductor 18.

Filter network 300 is operated by delivering a short pulse to the gate of transistor 12 to release a corresponding short burst of energy across the transistor source/drain terminals and into the resonant filter network. During the resulting short conduction cycle, drain current of transistor 12 rises roughly linearly with time through inductor 14. If the drain current is limited to four amperes by controlling the duration of a gate pulse, energy stored in inductor 14 is calculated to be approximately 530 nanoJoules (nJ). The time taken to reach this level is about 9.5 nanoseconds (ns), which is relatively short compared to the UWB pulse duration (roughly 50 ns for a 20 MHz bandwidth waveform). Thus, transistor 12 forms a good approximation of a current source impulse generator as the conduction path therein is pinched off and of substantially high impedance during a majority of the time of network resonance. In this example, the filter network 300 resonates for more than 50 ns after the onset of impulse excitation, during which time transistor 12 is turned off. Note that transistor 12 is intended to be operated as a switch, and so it operates in a highly nonlinear mode.

In practice, for such short duration pulses, most transistors can be operated at significantly higher current levels than specified by their maximum ratings. This is due to the fact that deleterious heating effects are minimized through the use of short pulses. For example, as much as eight amperes may be drawn through an MRF166C transistor for short time periods at a single time instance or at multiple, repetitive time instances. As such, it has been found that significantly more power can be delivered by the filter network 300 without damaging transistor 12 by scaling the network impedance down to 25Ω. Furthermore, the energy stored in capacitor 13 of network 300 can be significant. As described to this point, that energy is completely lost or dissipated in transistor 12 when turned on. Charge stored in capacitor 13 contributes to the drain current of transistor 12 but does nothing useful.

Figure 4A:
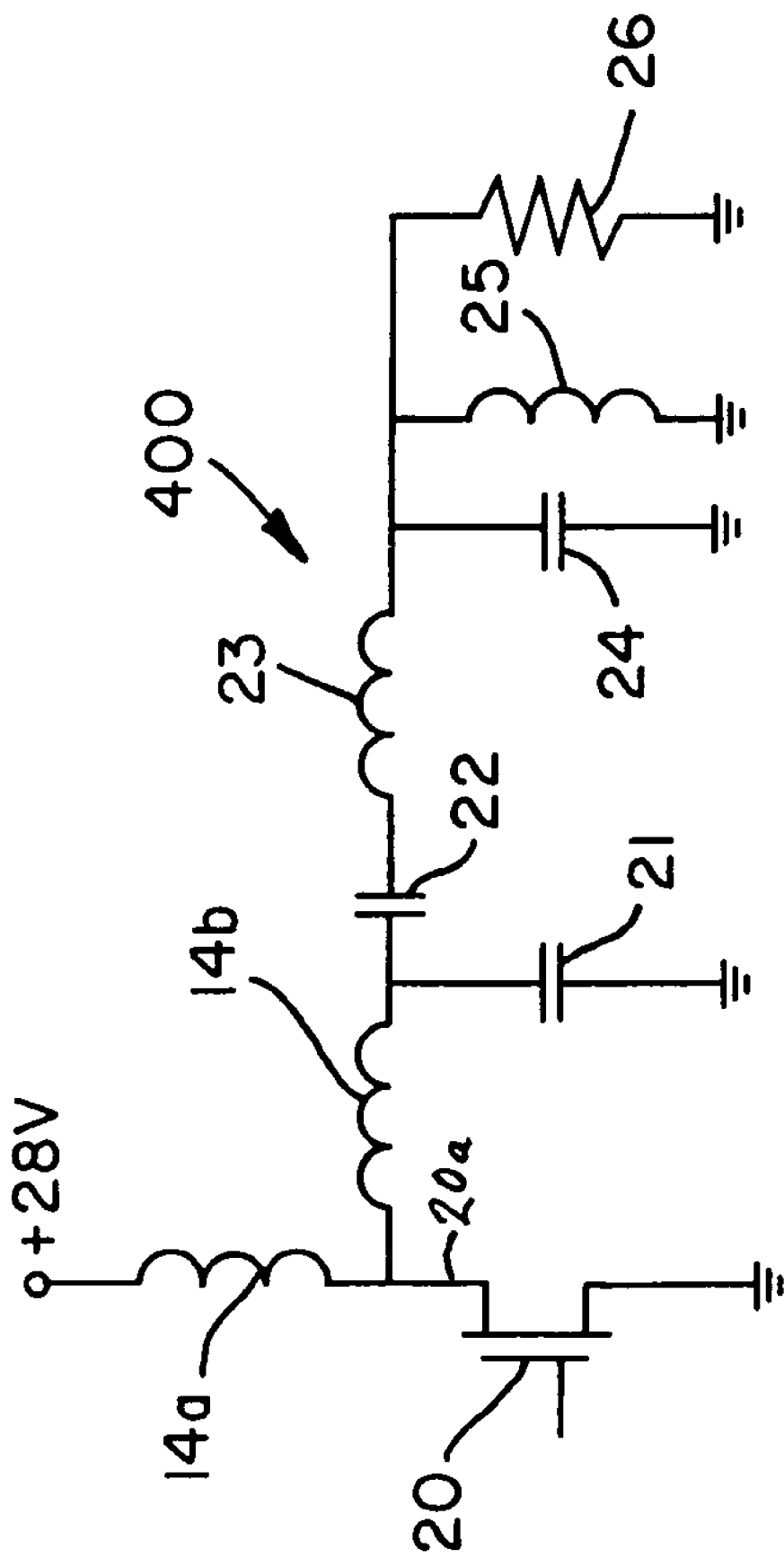
FIG. 4A shows a de-normalized bandpass filter network for a 25-ohm load in the 30-50 MHz band with the input modified to achieve a secondary resonance condition, and coupled to a power transistor to effect delivery of 15 to 20 watt pulses to the 25-ohm load.

FIG. 4A shows an improved, high-power filter network 400 that achieves greater than 50% power efficiency. Relative to the circuit of FIG. 3, circuit components of FIG. 4A have been further scaled to match the output impedance of 25Ω load 26. By scaling the filter network 300 to match the twenty-five ohm output impedance, the 66 hH value of inductor 14 (FIG. 3) becomes 33 nH in FIG. 4A. In accordance with another aspect of the present invention, however, the corresponding inductor 14 (FIG. 3), when designing the filter network 400 of FIG. 4A, is split into two inductor sections 14a and 14b of 29 nH and 6 nH, respectively. Parametric values of other circuit components have also been scaled in FIG. 4A. When scaled, the values of capacitors 21, 22, and 24 of network 400 become 450 pF, 64 pF, and 320 pF, respectively. The values of inductors 23 and 25 become 265 nH and 52 nH, respectively.

During operation of filter network 400 (FIG. 4A), turn-on of transistor 20 effects current flow through each inductor section 14a and 14b. Upon firing the transistor, current in inductor 14b will be drawn from charge stored on capacitor 21 to set up a resonance condition between inductor 14b and capacitor 21. This resonance condition decays fairly rapidly and, by choosing an 85/15 ratio between the inductance of elements 14a to 14b, there comes a point in time where increasing current in inductor 14a is substantially opposed by a reverse current in inductor 14b so that the current through transistor 20 becomes zero. Furthermore, a point in time will occur near the peak voltage across capacitor 21 where the voltage swing passes through zero to a negative value and then swings back to a positive value via the resonance process. Thus, some fraction of the voltage across capacitor 21 may be recovered by splitting inductor 14 (FIG. 3) into two sections and by carefully controlling the timing of the conduction cycle of transistor 20. Advantageously, filter circuit 400 produces fifteen-watt UWB pulses with better than a 50% DC-to-RF efficiency. Based on principles set forth herein, it is also seen that values of other network components may be altered to achieve different power ratios or efficiencies.

Figure 4B:
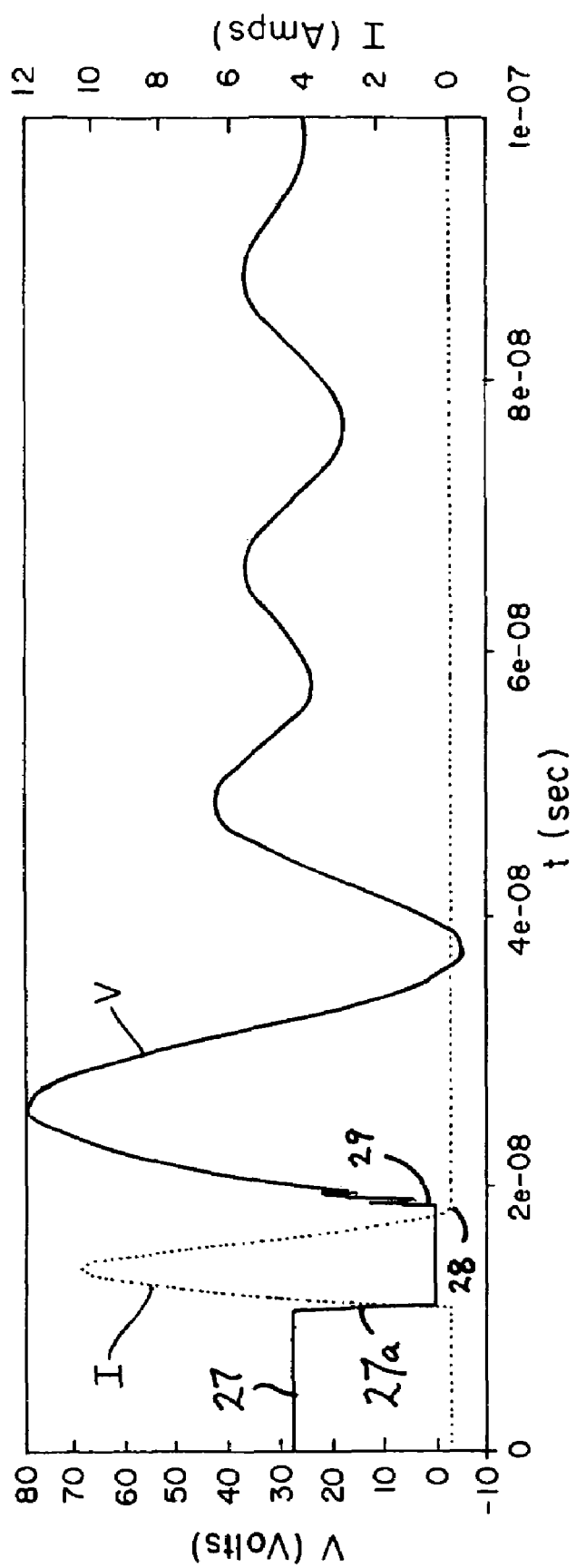
FIG. 4B shows current I in the switching device of FIG. 4A, as well as the voltage V across the device, for which resonance causes current to approach zero a short time after firing the switching device.

FIG. 4B shows computer simulated waveforms of a gate signal 27 as well as the current I flowing through and the voltage V appearing at the drain terminal 20a of transistor 20 of filter network 400 (FIG. 4A). Due to a carefully chosen resonance condition, the currents in inductor section 14a and 14b substantially cancel, causing current flow I through transistor 20 to drop to very near zero at point 28 after a short time period, e.g., about 8.5 nsec after falling edge 27a of gate pulse 27. By turning off switching device 20 at this point in time, as indicated by the rising edge 29 of gate signal 27 (at or near when voltage V begins cycling), essentially no abrupt change in inductor current occurs in either inductor 14a or 14b. As a result, there is no substantial voltage spike on switching device 20 at this point. This serves not only to protect transistor 20 from potentially damaging output voltages, but also to reduce losses associated with whatever transient may occur as the currents in 14a and 14b were brought into agreement.

Figure 5:
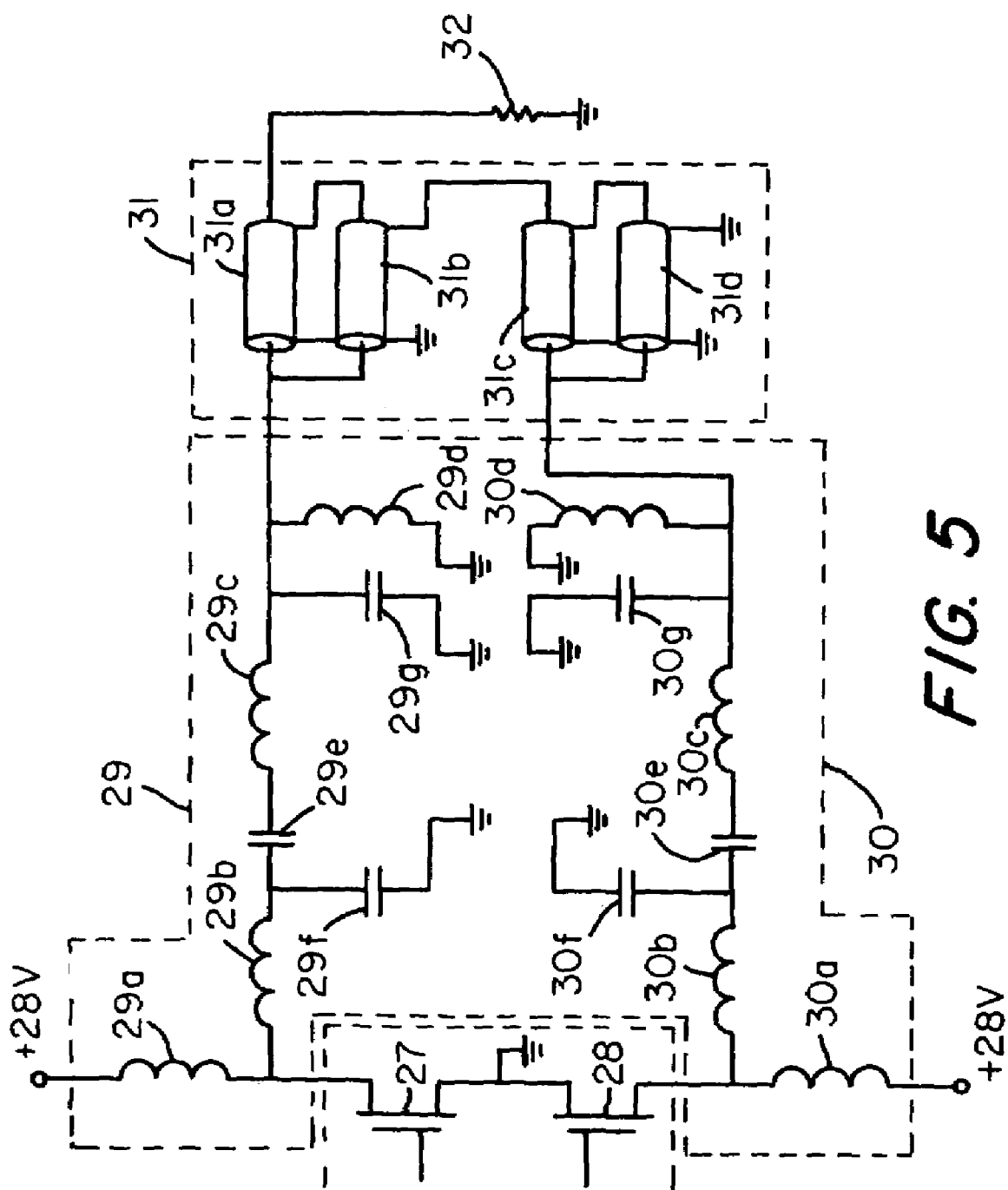
FIG. 5 shows a tandem pair of de-normalized bandpass filter networks, each with seven-ohm characteristic impedance, coupled to a power combiner for driving a 50-ohm load, and driven by a dual power transistor. Inputs of the filter network have been modified for secondary resonance. Output power from this circuit is approximately 180 watts.

FIG. 5 shows yet another higher power filter network according to an alternative embodiment of the invention in which a pair of power transistors 27 and 28 are packaged together (for example, MRF141G transistors from Motorola) and are coupled to low impedance (7Ω) filter networks 29 and 30, and combined with combiner 31 to form a 50Ω output. Combiner 31 may be constructed from four pieces of 12Ω semi-rigid coaxial cable and four ferrite balun cores 31a, 31b, 31c, and 31d using techniques well known to those skilled in the art.

In the illustrated higher power embodiment, low impedance network 29 comprises split inductors 29a and 29b of 8.5 nH and 1.5 nH, respectively, as well as an inductor 29c of 75.5 nH and an inductor 29d of 15 nH. Values of capacitors 29e, 29f, and 29G are 220 pF, 1650 pF and 1120 pF, respectively. Similarly, low impedance network 30 comprises split inductors 30a and 30b of 8.5 nH and 1.5 nH, respectively, as well as an inductor 30c of 75.5 nH and an inductor 30d of 15 nH. Values of capacitors 30e, 30f, and 30G are 220 pF, 1650 pF and 1120 pF, respectively.

Advantageously, circuit 500 produces 180-watt UWB pulses at load 32 in the 30-50 MHz band with high power efficiency and without using an amplifier stage.

In the above-illustrated examples, circuitry for driving the switching devices can be implemented by a variety of techniques known to those skilled in the art. For example, a high speed CMOS monostable flip-flop can be used to generate a pulse of adjustable duration which is then amplified by any of various means and applied to the gate of the switching transistor (12, 20, 27 and 28 in the illustrated embodiments). Amplification can even be nonlinear, as is the operation of the switching device itself. In addition, use of a singly terminated filter network is preferred, but based on the teachings herein, other network types may be utilized.

It should be understood that numerous changes in details of construction and the combination and arrangement of elements and materials may be resorted to without departing from the spirit and scope of the invention as hereinafter claimed.

The invention claimed is:

1. An ultra wideband transmitter to transmit an ultra wideband signal, said transmitter comprising:
   a switching device that produces a pulse of energy in response to current flow through a conduction path thereof,
   a singly-terminated filter network to receive and dissipate said pulse of energy during a resonant cycle thereof, and
   a timing circuit to gate the switching device to release said pulse of energy directly into the filter network and to pinch-off a conduction path of said switching device substantially within a first current cycle thereof whereby to reduce energy loss within the switching device and to deliver a substantial portion of said energy to the filter network.

2. The transmitter of claim 1 wherein said switching device comprises a field-effect transistor, and further includes a bias voltage applied to said transistor to effect production of said pulse in response to said timing circuit.

3. The transmitter of claim 2, wherein said filter network includes an antenna that controls the transmitted ultra wideband signal in at least one of center-frequency, bandwidth, and impedance value of a load.

4. The transmitter of claim 1, wherein said filter network includes a series inductor sectioned into two sections, and wherein said switching device includes a drain terminal coupled to said filter network between said sectioned inductors whereby to produce opposing resonant potentials at said drain terminal after issuance of said pulse.

5. The transmitter of claim 4, wherein said timing circuit pinches off the conduction path of said transistor when current in the drain terminal approaches or nears zero after release of said pulse of energy whereby to reduce switching transients.

6. The transmitter of claim 3, wherein circuit elements of said filter network take into account parasitic capacitance of said transistor during non-conduction to provide said at least one of center-frequency and bandwidth.

7. An ultra wideband transmitter to supply a spectrally filtered UWB signal to a load device comprising:
   a switching device having a gate to produce a UWB pulse,
   a singly-terminated resonant circuit that provides a desired spectral response for said UWB pulse, said resonant circuit including a series inductor and a shunt capacitor,
   a timing circuit to drive the gate of the switching device to initiate release of a current pulse into the inductor of said resonant circuit and to pinch off a conduction path of the switching device after issuance of the current pulse so as to substantially eliminate dissipation of energy across said switching device during resonance of said resonant circuit, and a load device coupled to an output of said resonant circuit to dissipate energy of said resonant circuit during said resonance, whereby to efficiently produce said spectrally filtered UWB signal across said load device.

8. The transmitter of claim 7, wherein said load device comprises an antenna and said timing circuit switches off said switching device at or near a zero crossing of a current cycle of said switching device.

9. The transmitter of claim 8, wherein said series inductor is split into two sections, and said switching device is connected between said sections to produce opposing currents between said sections after release of pulse.

10. An ultra wideband transmitter that produces a band-limited ultra wideband signal of a desired energy level, said transmitter comprising a pulse conditioning circuit having a predetermined spectral response, a source of power to apply a bias potential across a switching device, and a timing circuit that controls said switching device to effect release of a current pulse into the pulse conditioning circuit and to switch off said switching device during a falling current cycle thereof whereby to dissipate a majority of pulse energy of the pulse conditioning circuit into a load device instead of said switching device.

11. The ultra wideband transmitter of claim 10, wherein said switching device comprises a field-effect transistor, and said timing circuit effects opening of a conduction path of the transistor to produce said current pulse by operating said transistor in a non-linear mode to pinch-off the conduction path after release of said pulse.

12. The ultra wideband transmitter of claim 11, wherein said pulse conditioning circuit comprises a resonant circuit, and said timing circuit releases said pulse before completion of a current cycle through a drain terminal of said switching device.

13. The ultra wideband transmitter of claim 11, wherein said timing circuit controls said gate to effect pinching-off the conduction path when drain current of said transistor reaches or is near zero.

14. The ultra wideband transmitter of claim 11, wherein a load device of said pulse conditioning circuit comprises an antenna.

15. A highly-efficient ultra wideband transmitter having an power conversion ratio greater than 50% comprising:
   an antenna,
   a resonant circuit including a singly terminated inductor-capacitor network coupled directly to said antenna,
   a switching device that applies a pulse of energy across an inductor of the inductor-capacitor network of said resonant circuit, and
   a timing circuit to gate the switching device to open a conduction path thereof to supply said pulse directly to said resonant circuit, and to pinch-off the conduction path of the switching device during a current cycle of said switching device after release of said pulse to said resonant circuit, whereby to dissipate greater than 50% of pulse energy of said resonant circuit into said antenna instead of said switching device.

16. The transmitter of claim 15, wherein said timing circuit effects pinching-off said switching device when drain current through said switching device approaches or nears zero after release of said pulse.

17. The transmitter of claim 15, wherein said timing circuit effects control to terminate said pulse at a given point during a falling portion of a first current cycle of said switching device.

* * * * *